(12) United States Patent
Meyer et al.

(10) Patent No.: US 11,827,238 B2
(45) Date of Patent: Nov. 28, 2023

(54) COMPUTING ARCHITECTURE OF AN AUTONOMOUS VEHICLE

(71) Applicant: GM Cruise Holdings LLC, San Francisco, CA (US)

(72) Inventors: Michael Meyer, Munich (DE); Georg Kuschk, Garmisch-Partenkirchen (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 16 days.

(21) Appl. No.: 17/463,385

(22) Filed: Aug. 31, 2021

(65) Prior Publication Data

US 2023/0063476 A1 Mar. 2, 2023

(30) Foreign Application Priority Data

Aug. 30, 2021 (EP) ..................................... 21193821

(51) Int. Cl.
*B60W 60/00* (2020.01)
*G06N 3/045* (2023.01)
(Continued)

(52) U.S. Cl.
CPC .......... *B60W 60/001* (2020.02); *B60W 10/04* (2013.01); *B60W 10/18* (2013.01); *B60W 10/20* (2013.01); *G05B 13/027* (2013.01); *G06N 3/045* (2023.01); *H04N 7/183* (2013.01); *B60W 2420/42* (2013.01); *B60W 2420/52* (2013.01); *B60W 2710/18* (2013.01);
(Continued)

(58) Field of Classification Search
CPC .... B60W 60/001; B60W 10/04; B60W 10/18; B60W 10/20; B60W 2420/42; B60W 2420/52; B60W 2710/18; B60W 2710/20; G05B 13/027; G06N 3/045; H04N 7/183; G05D 1/0231; G05D 1/0257
See application file for complete search history.

(56) References Cited

U.S. PATENT DOCUMENTS 9,632,590 B2 * 4/2017 Kramer ................ G01C 21/265
9,915,950 B2 * 3/2018 Hartung ............... G05D 1/0231
(Continued)

FOREIGN PATENT DOCUMENTS

| WO | 2020113160 A2 | 6/2020 | |
| WO | 2020113160 A3 | 6/2020 | |
| WO | WO-2020113160 A2 * | 6/2020 | ............. G01S 13/60 |

OTHER PUBLICATIONS

"Extended European Search Report for European Patent Application No. 21193821.2", dated Feb. 4, 2022, 11 pages.
(Continued)

Primary Examiner — Babar Sarwar
(74) Attorney, Agent, or Firm — CALFEE, HALTER & GRISWOLD LLP

(57) ABSTRACT

The technologies described herein relate to a computing architecture in an autonomous vehicle (AV). The AV includes a radar system that includes a local data processing device. The AV also includes a centralized data processing device. The local data processing device is configured to perform processing on raw sensor data generated by the radar system to form a feature vector. The local data processing device transmits the feature vector to the centralized data processing device, which performs further processing to identify an object in an environment of the AV.

21 Claims, 5 Drawing Sheets

(51) Int. Cl.
*B60W 10/04* (2006.01)
*B60W 10/18* (2012.01)
*B60W 10/20* (2006.01)
*G05B 13/02* (2006.01)
*H04N 7/18* (2006.01)
*G05D 1/02* (2020.01)

(52) U.S. Cl.
CPC ....... *B60W 2710/20* (2013.01); *G05D 1/0231* (2013.01); *G05D 1/0257* (2013.01)

(56) References Cited

U.S. PATENT DOCUMENTS

| | | | | |
|---|---|---|---|---|
| 10,036,801 B2* | 7/2018 | Retterath | | G01S 17/10 |
| 10,118,618 B2* | 11/2018 | Pawlicki | | G06V 20/56 |
| 11,568,655 B2* | 1/2023 | Chao | | G06N 20/00 |
| 2003/0201929 A1* | 10/2003 | Lutter | | G01S 13/931 |
| | | | | 342/72 |
| 2010/0001897 A1* | 1/2010 | Lyman | | G01S 13/867 |
| | | | | 701/93 |
| 2010/0271614 A1* | 10/2010 | Albuquerque | | G01S 7/4811 |
| | | | | 356/4.01 |
| 2011/0095910 A1* | 4/2011 | Takano | | G06T 11/00 |
| | | | | 340/932.2 |
| 2019/0129013 A1* | 5/2019 | Gilliland | | H04N 25/41 |
| 2019/0310375 A1* | 10/2019 | Finkelstein | | G01S 7/4868 |
| 2019/0332875 A1* | 10/2019 | Vallespi-Gonzalez | | |
| | | | | G05D 1/0088 |
| 2019/0361454 A1* | 11/2019 | Zeng | | G05D 1/0214 |
| 2020/0301013 A1* | 9/2020 | Banerjee | | G01S 13/867 |
| 2021/0241026 A1* | 8/2021 | Deng | | G01S 13/87 |
| 2021/0255304 A1* | 8/2021 | Fontijne | | G01S 17/931 |
| 2023/0035747 A1* | 2/2023 | Kapsenberg | | H04N 7/183 |

OTHER PUBLICATIONS

"Response to the European Search Report for European Patent Application No. 21193821.2", Filed Date: Jun. 28, 2022, 11 pages.

* cited by examiner

COMPUTING ARCHITECTURE OF AN AUTONOMOUS VEHICLE

RELATED APPLICATION

This application claims priority to European Patent Application No. EP 21193821.2, filed on Aug. 30, 2021. The entirety of this application is incorporated herein by reference.

BACKGROUND

In connection with navigating an environment, an autonomous vehicle (AV) perceives objects surrounding the AV based upon sensor signals generated by sensor systems of the AV. For example, the AV may include cameras, a lidar sensor system, a radar sensor system, etc., where a centralized processing device receives data based upon sensor signals generated by such sensor systems and performs a variety of different subtasks, such as free space detection, scene classification, and detection of other vehicles and pedestrians.

Radar sensor systems exhibit some advantages over lidar sensor systems and cameras with respect to their usage in AVs. For instance, compared to cameras and lidar sensor systems, radar sensor systems are more invariant to weather changes, such that data generated by a radar sensor system can be used to enable autonomous driving under severe weather conditions (such as heavy rain or snow). In addition, radar sensor systems are able to capture velocity information nearly instantaneously. Further, radar sensor systems have a greater range than cameras and lidar sensor systems.

Radar sensor systems, for predefined time intervals, generate data tensors, where a data tensor may be one of several types of data tensors, depending upon the stage of processing: 1) a first type of data tensor that includes bins for samples, ramps, and channels (time domain data); 2) a second type of data tensor that includes bins for range, ramps, and channels (range data); a third type of data tensor that includes bins for range, doppler, and channels (velocity data); and 4) a fourth type of data tensor that includes bins for range, doppler, and azimuth (beam data). One or more of the bins of the types of data tensors referenced above may include complex-valued phase information. Conventionally, the radar system is configured to construct a three-dimensional point cloud based upon the sensor data (which may include data tensors of one or more of the types referenced above) and transmit the point cloud to a centralized data processing device of the AV, such as a graphics processing unit (GPU). The centralized data processing device executes a deep neural network (DNN), where the three-dimensional point cloud generated by the radar system is provided as input to the DNN, and the DNN generates output data based upon the three-dimensional point cloud. The centralized processing device assigns a label to an object (such as a pedestrian or other vehicle) represented in the three-dimensional point cloud based upon output of the DNN.

Transforming the data tensor(s) generated by the radar system into a three-dimensional point cloud results in loss of information. Accordingly, resolution of a three-dimensional point cloud generated by a radar system is substantially less than resolution of a three-dimensional point cloud generated by a lidar system. There is typically, however, insufficient bandwidth over communications channels in an AV to support transmittal of the data tensor generated by the radar system to the centralized processing device.

SUMMARY

The following is a brief summary of subject matter that is described in greater detail herein. This summary is not intended to be limiting as to scope of the claims.

Various technologies relating to a computing architecture in an autonomous vehicle (AV) are described herein. An AV includes a radar sensor system, where the radar sensor system includes at least one transmitting antenna, at least one receiving antenna, and a local data processing device that is in communication with the at least one transmitting antenna and the at least one receiving antenna. In an example, the local data processing device is a digital signal processor (DSP). The local data processing device of the radar system is configured to generate data tensors based upon echo signals detected by the at least one receiving antenna of the radar system. The data tensors can include one or more of the following types of data tensor: may be one of several types of data tensors, depending upon the stage of processing: 1) a first type of data tensor that includes bins for samples, ramps, and channels (time domain data); 2) a second type of data tensor that includes bins for range, ramps, and channels (range data); a third type of data tensor that includes bins for range, doppler, and channels (velocity data); and 4) a fourth type of data tensor that includes bins for range, doppler, and azimuth (beam data), where the data tensor includes real and/or complex values. Values in data tensor(s) generated by the radar system may be in a polar coordinate system.

In contrast to conventional architectures of a AVs, the local data processing device executes a first deep neural network (DNN), where the first DNN receives one or more data tensors as input. The first DNN, however, is not configured to perform perception tasks. Instead, for instance, the first DNN can be configured to transform a data tensor from the polar coordinate system to the Cartesian coordinate system and can further be configured to extract embedded features from the transformed data tensor. Thus, output of the first DNN includes values for embedded features represented in the data tensor. Thus, the local data processing device of the radar system need not perform all computations associated with perception based upon the data tensor. In addition, the local data processing device does not transmit the raw data tensor to the centralized processing device of the AV.

The local data processing device transmits output of the first DNN to a centralized data processing device of the AV, where the centralized data processing device may be or include a central processing unit (CPU), a graphical processing unit (GPU), or other suitable processing device. The centralized data processing device executes a second DNN, where the second DNN receives the output data of the first DNN as input to the second DNN. Hence, instead of receiving a three-dimensional point cloud or the raw radar data, the centralized data processing device receives values for the embedded features output by the first DNN that is executed by the local data processing device. This is advantageous, as the raw sensor data is processed to improve detections, and is further advantageous as the raw sensor data is not transmitted over a communications channel between the local processing device and the centralized data processing device, thereby conserving bandwidth. The second DNN, executed by the centralized data processing device, generates output data based upon the output data of the first DNN (received from be local data processing device). The centralized data processing device assigns a label to an object represented in the raw sensor data based upon the output of the second DNN, where the label may be indicative of an identity of the object, a location of the object in a scene, etc. For instance, the centralized data processing device can assign a label to an object represented in the raw sensor data that indicates that the object is a pedestrian.

There are various advantages to the architecture described herein over conventional computing architectures of AVs. The architecture described herein results in a reduction in an amount of data that is transferred from the radar sensor system to the centralized data processing device, as the data output by the first DNN are embedded feature values extracted from the raw sensor data (the data tensor) rather than a (low resolution) three-dimensional point cloud generated based upon the raw sensor data. In addition, object detection and labeling accuracy is increased, as the first DNN executing on the local data processing device of the radar sensor system generates output data based upon the raw sensor data, which includes complex phase information, instead of based upon a three-dimensional point cloud. In addition, when the radar sensor system is replaced with another (more advanced) model, the second DNN executed by the centralized data processing device can remain unchanged, so no data needs to be relabeled. Instead, only a DNN executed by the new radar system needs to be trained such that embeddings output by the new radar system are the same as those output by the previous radar system. Finally, the architecture described herein reduces network load as well as the workload of the centralized data processing device, as the feature extraction backbone is placed on the radar sensor system (which may also reduce latency).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
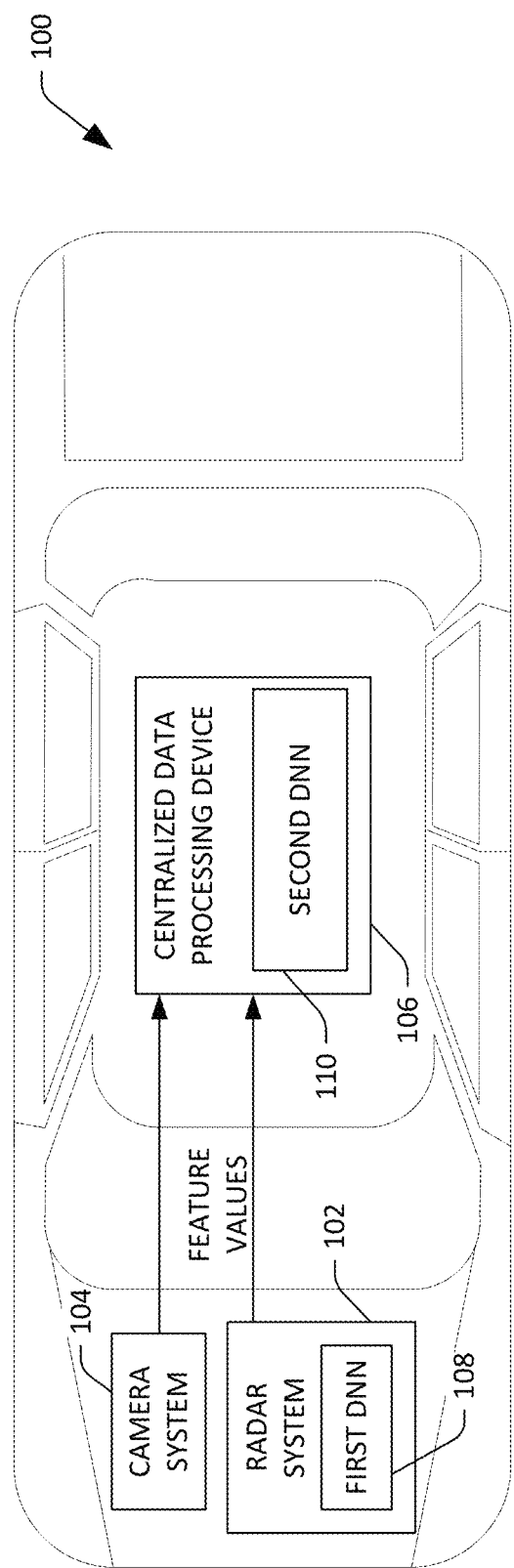
FIG. 1 is a schematic that illustrates an autonomous vehicle (AV) that includes a radar system and a central data processing device, where the output of a first deep neural network (DNN) executed by a local processing device of the radar system is provided as input to a second DNN executed by the centralized data processing device.

Various technologies pertaining to processing of radar sensor data in an autonomous vehicle (AV) are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies pertaining to a computing architecture in an AV, where raw radar data generated by a radar system is provided as input to a first deep neural network (DNN) executed by a local data processing device of the radar system. The first DNN of the radar system outputs values for embedded features in the raw radar data, and the local data processing device of the radar system transfers the values of the embedded features to a centralized data processing device of the AV (e.g., by way of an Ethernet connection or other suitable network connection). The centralized data processing device executes a second DNN, where the values of the embedded features output by the first DNN are provided as input to the second DNN executed by the centralized data processing device. Output of the second DNN can then be employed by the centralized data processing device to control the AV to perform a driving maneuver. For example, output of the second DNN may indicate existence of a particular type of object in proximity to the AV, such as a pedestrian, a bicyclists, another vehicle, etc. The driving maneuver may be a braking of the AV, a swerve, acceleration, deceleration, or other suitable driving maneuver.

The computing architecture described herein has various advantages over conventional computing architectures of AVs, in that a DNN is provided with raw radar data as input (instead of a three-dimensional point cloud). Therefore, the first DNN executed by the local data processing device of the radar system can receive a data tensor output by the radar system, where the data tensor includes real or complex values for phase information in bins of the data tensor. In addition, an amount of data transmitted from the radar system to the centralized data processing device can be reduced when compared to conventional architectures, as the radar system is configured to transmit values of features rather than an entirety of a three-dimensional point cloud to the centralized data processing device. Finally, processing load of the centralized data processing device is reduced when compared to conventional computing architectures in AVs, as part of the DNN processing is offloaded from the centralized data processing device to the localized data processing device of the radar system.

Referring now to FIG. 1, an AV 100 is illustrated. The AV 100 can be a level 5 fully autonomous AV. While illustrated as an automobile, it is to be understood that the AV 100 may be a truck, a motorcycle, a ground-based drone, or other suitable AV. The AV 100 includes a radar system 102, a camera system 104, and a centralized data processing device 106, where the radar system 102 and the camera system 104 are configured to transmit data to the centralized data processing device 106. While not illustrated, the AV 100 may also include a lidar sensor system, an ultra-sonic sensor system, an infrared sensor system, a global positioning system (GPS), an accelerometer, and/or other suitable sensor systems. Further, while the radar system 102 and camera system 104 are shown as being located at the front of the AV 100, with the centralized data processing device 106 being near a center of the AV 100, it is to be understood that the radar system 102, the camera system 104, and the centralized data processing device 106 may be positioned at any suitable location within or upon the AV 100. It is desirable, however, that the radar system 102 and the camera system 104 be located proximate to one another such that the radar system 102 and the camera system 104 have similar fields of view.

As described above, conventionally, a radar system of an AV is configured to generate raw radar data in the form of data tensors that has bins of multiple dimensions, where, for one type of data tensor, the bins include range, Doppler (velocity), and azimuth (beam), where the data tensor can include real and complex values for phase information generated by the radar system. Conventionally, a local data processing device of the radar system is configured to construct a three-dimensional point cloud based upon values in the data tensor, resulting in loss of a significant amount of data. The conventional radar system is then configured to transmit the three-dimensional point cloud to a centralized data processing device of the AV, where the centralized data processing device provides the three-dimensional point cloud as input to a deep neural network (DNN) that is executed by the centralized data processing device. This approach has disadvantages in that information in the raw sensor data is discarded when the three-dimensional point cloud is constructed, and resultant resolution of the three-dimensional point cloud is lower than resolutions of three-dimensional point clouds generated by lidar sensor systems.

In contrast to this conventional arrangement, the local data processing device of the radar system 102 executes a first DNN 108, where raw radar data generated by the radar system 102 is provided as input to the first DNN 108. Based upon such input, the first DNN 108 outputs values for embedded features in the raw radar data. Put differently, the first DNN 108 generates first output data, where the first output data is a feature vector that includes values of embedded features in the raw radar data. The local data processing device of the radar system 102 transmits the first output data to the centralized data processing device 106. The centralized data processing device 106 executes a second DNN 110, where the second DNN 110 is provided with the first output data (generated by the first DNN 108) as input to the second DNN 110. The second DNN 110, based upon such input, generates second output data, where the second output data is indicative of a type of object in an environment of the AV 100, where the object is represented in the raw radar data generated by the radar system 10. The centralized data processing device 106 can assign a label to the object represented in the raw radar data based upon the second output data generated by the second DNN 110, and the centralized data processing device 106 can control at least one of a propulsion system (e.g., an electric motor, a gas engine, etc.), a braking system, or a steering system to cause the AV 100 to perform a driving maneuver based upon the assigned label. In an example, the label can be a multi-dimensional state vector, wherein the vector can encode information such as position of the object in 3-dimensional space (e.g., x, y, and z coordinates), size of the object (e.g., height, width, and depth of the object), orientation of the object, and motion of the object (e.g., velocity, yaw, pitch, roll, etc.). In another example, the label can be a type of the object (e.g., vehicle, pedestrian, etc.).

Additionally, the second DNN 110 can receive data that is based upon output of the camera system 104 and include such data as input to the second DNN 110. Thus, the second output data of the second DNN 110 can be based upon both raw radar data generated by the radar system 102 and images generated by the camera system 104. Optionally, images output by the camera system 104 can be processed such that the input to the second DNN 110 that is based upon images generated by the camera system 104 has a same format as the first output data generated by the first DNN 108. The images generated by the camera system 104 can be processed, such that the resultant data is configured for use as input data to the second DNN 110, by a localized data processing device of the camera system 104 or by the centralized data processing device 106.

The radar system 102 may be any suitable type of radar system, such as a continuous wave (CW) radar system (including a frequency modulated continuous wave (FMCW) radar system or an unmodulated CW radar system) or a pulsed radar system. The centralized data processing device 106 can be a central processing unit (CPU), a graphical processing unit (GPU), a field programmable gate array (FPGA), or any suitable combination of such computing devices. Further, the first DNN 108 and the second DNN 110 may be or include any suitable type of DNN, including a convolutional neural network, a recurrent neural network, a graph neural network, etc.

Figure 2:
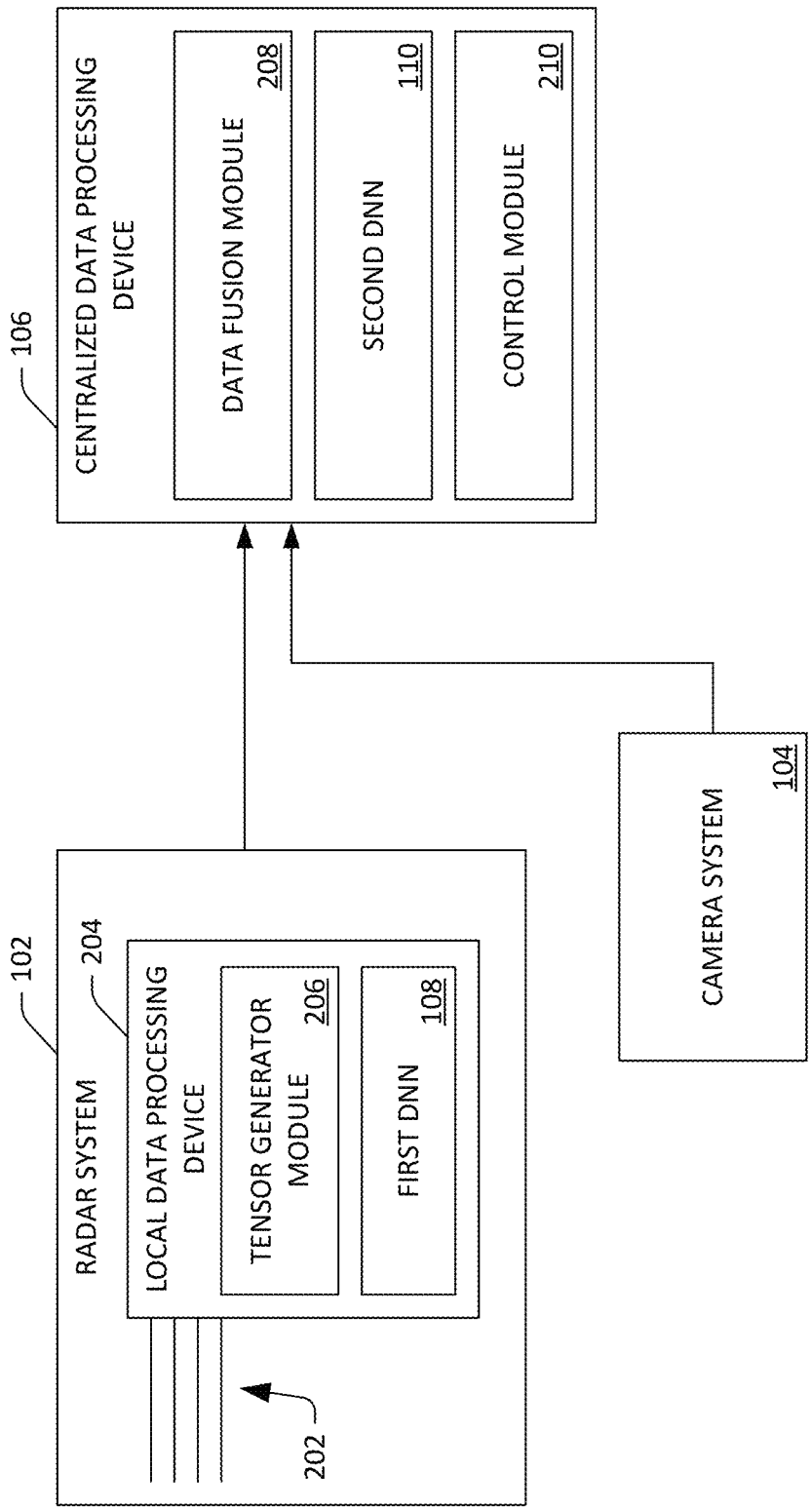
FIG. 2 is a functional block diagram of a system where output of a first DNN executed by a local data processing device of a radar system is provided as input to a second DNN executed by a centralized data processing device of an AV.

Referring now to FIG. 2, a functional block diagram of the computing architecture of the AV 100 illustrated in FIG. 1 is depicted. The radar system 102 includes several antennas 202, where the antennas 202 include a transmitting antenna and a receiving antenna (although it is to be understood that the antennas 102 can include multiple transmitting antennas and multiple receiving antennas). The transmitting antenna is configured to emit radar signals into an environment of the AV 100, and the receiving antenna is configured to detect echo signals (reflections of the radar signals emitted by the transmitting antenna). The radar system 102 also includes a local data processing device 204 that is in communication with the antennas 202. In an example, the local data processing device 204 is a digital signal processor (DSP) of the radar system 102.

The local data processing device 204 includes a tensor generator module 206 that generates data tensors based upon echo signals detected by receiving antennas in the antennas 202. Pursuant to an example, the radar system 102 may be an FMCW radar system, where a radar signal with a linearly modulated frequency is emitted and the echo signal that is reflected from objects in a scene is recorded. In operation, the received echo signal is mixed with the transmitted radar signal to obtain a frequency difference between the emitted radar signal and the echo signal, where the difference is referred to as a beat frequency. This beat frequency is indicative of the range of an object in the environment of the AV 100 (e.g., the distance between the radar system 102 and the object). The radar system 102 includes multiple receiver channels to infer azimuth angles of objects through digital beamforming. The radar signal pulse emitted by the transmitting antenna is repeated multiple times, and from the phase shift between adjacent pulses (caused by radial motion occurring between pulses within a range resolution cell), the Doppler radial velocity in the cell can be computed. Thus, the tensor generator module 206 can generate the data tensor, where the data tensor can be one or more of the following types: 1) a first type of data tensor that includes bins for samples, ramps, and channels (time domain data); 2) a second type of data tensor that includes bins for range, ramps, and channels (range data); a third type of data tensor that includes bins for range, doppler, and channels (velocity data); or 4) a fourth type of data tensor that includes bins for range, doppler, and azimuth (beam data). The data tensor(s) are subsequently employed to detect objects in the environment of the AV 100 as the AV 100 autonomously travels a region.

Due to the digital beamforming, the radar sensor 102 measures data in polar coordinates, with a specific resolution in range and azimuth. Thus, a signal (that corresponds to an object) that covers multiple bins in azimuth varies with range, because an object covers more and more azimuth bins the closer the object is to the radar system 102.

The local data processing device 102 also includes the first DNN 108. The first DNN 108 can receive a data tensor output by the tensor generator module 206, and can include operations that result in conversion of feature maps from polar coordinates to Cartesian space through bilinear interpolation. For instance, the first DNN 108 may include two convolutional layers, where the convolutional layers are configured to convert the feature maps to Cartesian space through bilinear interpolation. In another example, layers before the polar-Cartesian transformation can be replaced with graph convolutions. The graph can be constructed from the radar tensor in the following manner: each range beam cell forms a node with a C-dimensional node feature, where C corresponds to the number of Doppler channels. Each node has edges to other nodes which are either: 1) in the same beam and in neighboring range cells; or 2) in the same range gate and in neighboring beams.

Fort each edge, the Euclidean distance r can be determined between connected nodes i, j in Cartesian space and serves as a parameter for the edge weight $e_{j,i}$:

$$e_{j,i} = \frac{1}{1+r} \quad (1)$$

Such graph can be used as input to two consecutive Graph Convolutional Network (GCN) convolutional layers before the output is transformed back into a three-dimensional tensor and processed further with a pyramid residual neural network. In an example, the pyramid residual network is a two-dimensional residual network, where the first DNN 108 includes a first pyramid in the two-dimensional residual network, and the output of the first DNN 108 is values for embedded features (a feature vector) extracted from the three-dimensional data tensor output by the GCN convolution layers.

The centralized data processing device 106 receives the feature vector from the local data processing device 204 of the radar system 102. The centralized data processing device 106 optionally includes a data fusion module 208 that fuses the feature vector with feature vector(s) that are based upon data generated by other sensor systems of the AV 100. For example, the centralized data processing device 106 can receive or generate a second feature vector based upon images output by the camera system 104. The data fusion module 208 fuses the second feature vector (based upon images generated by the camera system 104) with the feature vector output by the local data processing device 204, so that the feature vectors have a common format. In addition, the data fusion module 208 can receive data and/or feature vectors from other sensor systems, including a lidar sensor system, an infrared sensor system, an ultrasonic sensor system, etc. In an example, the data fusion module 208 can generate the feature vectors based upon data received from the other sensor systems.

The centralized data processing device 106 provides the feature vector received from the radar system 102 as input to the second DNN 110. The second DNN 110, as described above, generates output data based upon the received feature vector, wherein the output is indicative of an identity of an object in the environment of the AV 100. Optionally, the second DNN 110 receives data from various different sensor systems by way of the data fusion module 208.

The centralized data processing device 106 also includes a control module 210, where the control module 210 receives the output of the second DNN (or a derivative of the output) and controls the AV 100 such that the AV 100 performs a driving maneuver that is based upon the output of the second DNN 110. The driving maneuver may be braking, a swerve, acceleration, etc.

Figure 3:
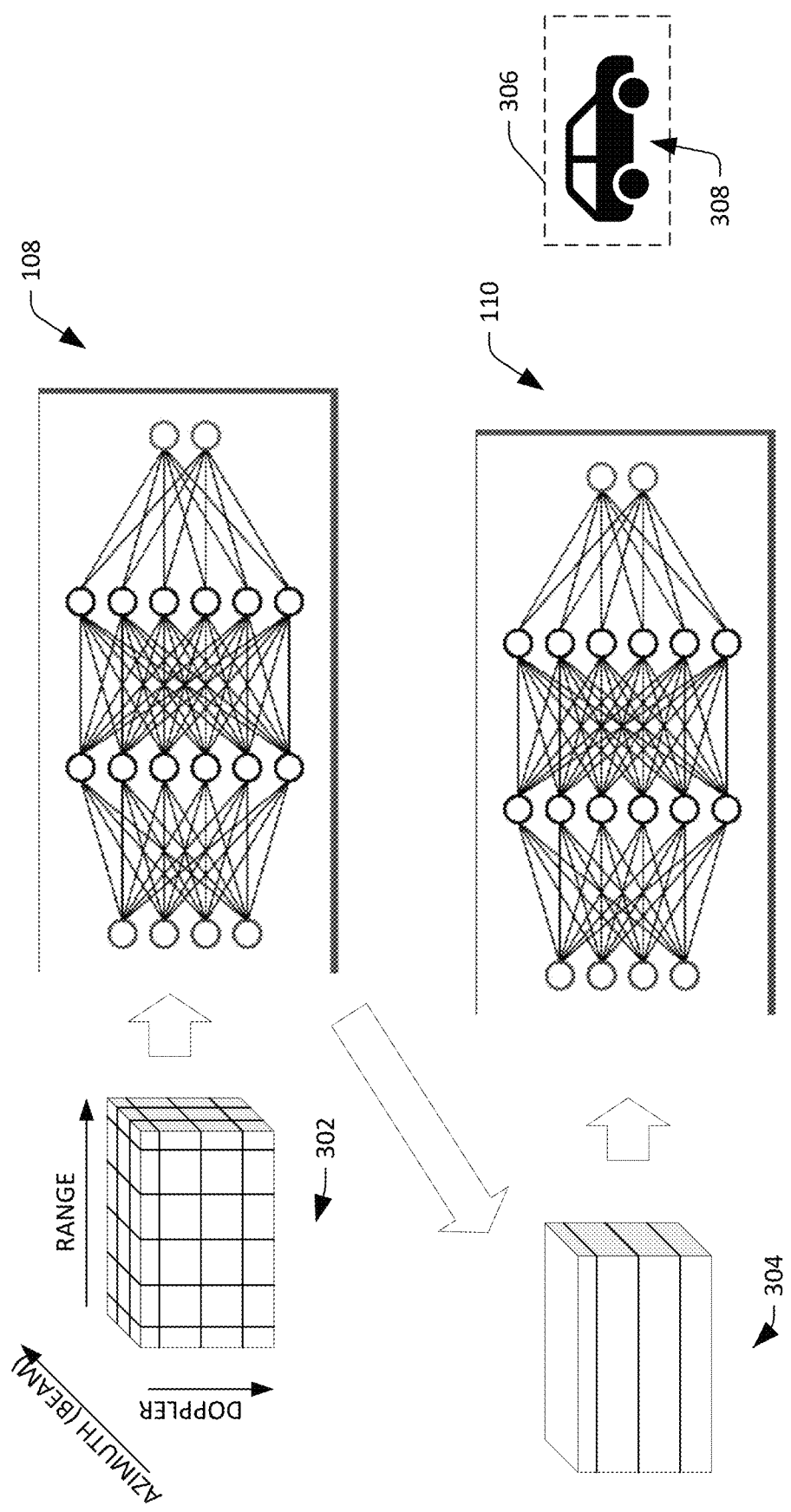
FIG. 3 is a schematic that illustrates flow of data between a radar system and a central data processing device of an AV.

Referring now to FIG. 3, a schematic depicting flow of data through the architecture shown in FIGS. 1 and 2 is illustrated. The radar system 102 generates a data tensor 302. Values in the data tensor 302 can be real and/or complex, and the data tensor 302 may include phase information. The data tensor 302 is provided as input to the first DNN 108. The first DNN 108 is configured to transform polar of the data tensor 302 into Cartesian space, and to further process the data by way of a residual neural network (e.g., a first pyramid of a two-dimensional residual network pyramid). Output of the first DNN 108 is values for features 304, which is a reduction in space compared to the data tensor 302. The values for the features 304 are provided as input to the second DNN 110, which outputs an indication that an object is in an environment of the AV 100 based upon the values for the features 304. The second DNN 110 can further output an indication of a type of the object in the environment of the AV 100 based upon the values for the features 304. As illustrated in FIG. 3, the output of the second DNN 110 can be used to place a bounding box 306 around a vehicle 308 represented in the data tensor 302.

Figure 4:
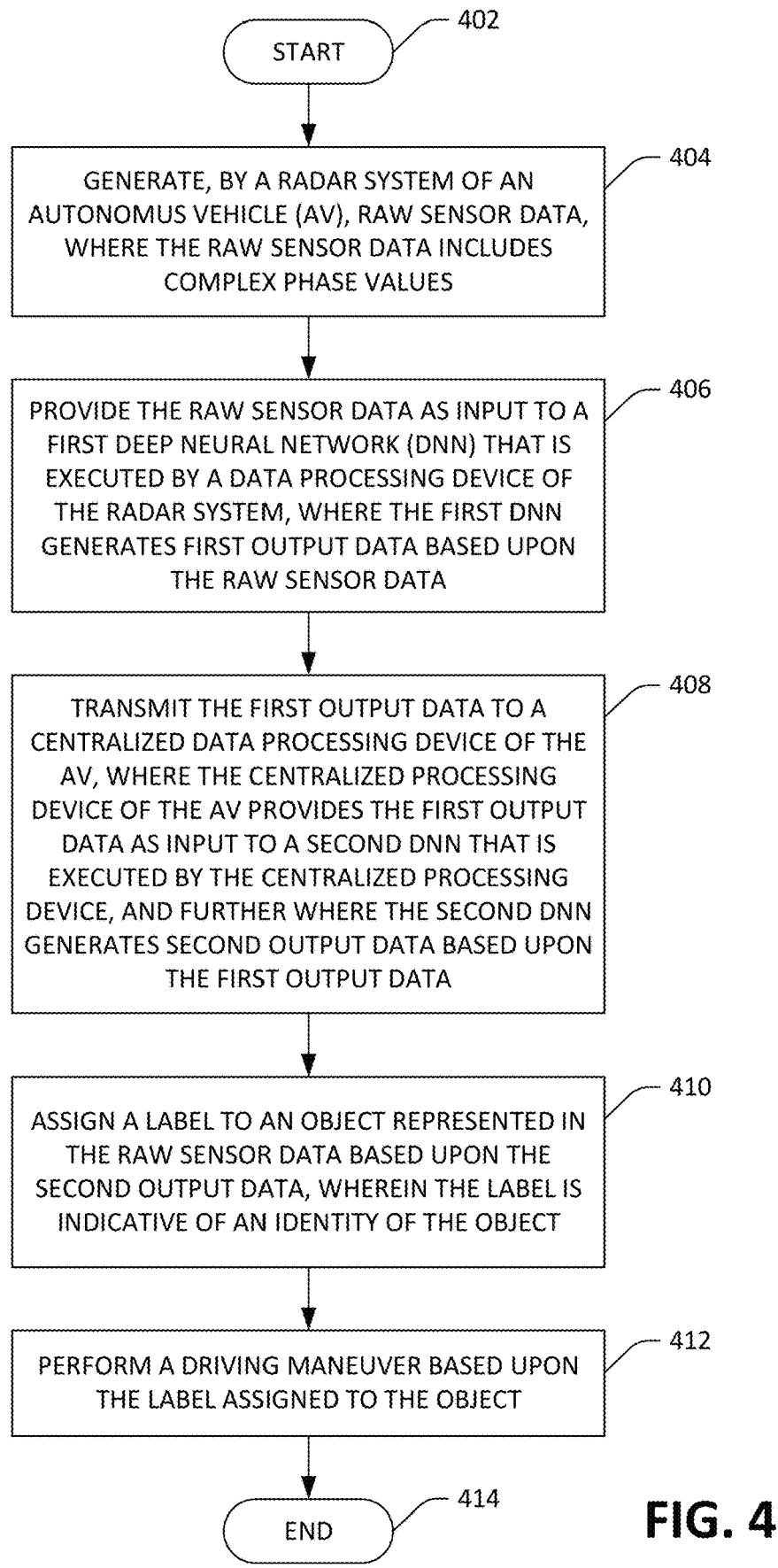
FIG. 4 is a flow diagram illustrating a methodology for performing a driving maneuver based upon a label assigned to an object represented in raw radar data generated by a radar system of an AV.

With reference to FIG. 4, a flow diagram illustrating a methodology 400 performed by an AV in connection with undertaking a driving maneuver is illustrated. The methodology 400 starts at 402, and at 404 a radar system of the AV generates raw sensor data, where the raw sensor data includes complex phase values. As described above, the raw sensor data may be in the form of a data tensor.

At 406, the raw sensor data is provided as input to a first DNN, where the first DNN is executed by a local data processing device of the radar system. The first DNN generates first output data based upon the raw sensor data. For instance, the first output data may be a feature vector for embedded features in the raw sensor data.

At 408, the first output data is transmitted to a centralized data processing device of AV, where the centralized processing device of the AV provides the first output data as input to a second DNN that is executed by the centralized data processing device. Additionally, the second DNN generate second output data based upon the first output data generated by the first DNN.

At 410, a label is assigned to an object represented in the raw sensor data, where the label is assigned to the object based upon the second output data generated by the second DNN, and further where the label is indicative of an identity of the object represented in the raw sensor data. Optionally, the centralized data processing device of the AV can accumulate information from multiple sub-detection systems with regard to multiple objects, and can further receive information as to the three-dimensional scene geometry. Behavior of the objects in the scene can be predicted based upon such accumulated information. At 412, a driving maneuver is performed by the AV based upon the label assigned to the object. Optionally, the driving maneuver is performed based upon the accumulated information referenced above. The methodology 400 completes at 414.

Figure 5:
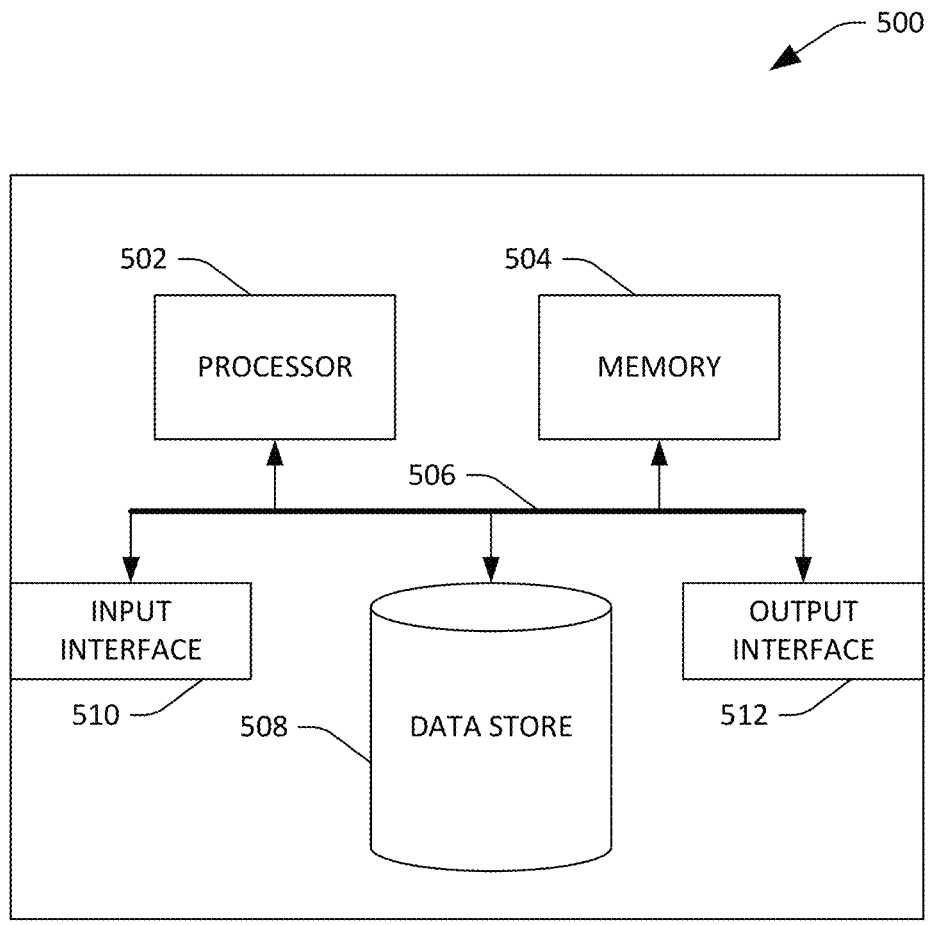
FIG. 5 is an example computing system.

Referring now to FIG. 5, a high-level illustration of a computing device 500 that can be used in accordance with the systems and methodologies disclosed herein is illustrated. For instance, the computing device 500 may be used in a system that is configured to perform a driving maneuver based upon outputs of multiple DNNs of an AV. By way of another example, the computing device 500 can be used in a system that is configured to compute correction factors to use when correcting an image. The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store raw sensor data, data tensors, extracted feature values, images, etc.

The computing device 500 additionally includes a data store 508 that is accessible by the processor 502 by way of the system bus 506. The data store 508 may include executable instructions, images, raw sensor data, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The features described herein relate to a computing architecture in an AV according to at least the examples provided below.

(A1) In one aspect, some embodiments include a method performed by an AV, where the method includes generating, by a radar system of the AV, raw sensor data, wherein the raw sensor data includes complex values. The method also includes providing the raw sensor data as input to a first DNN that is executed by a data processing device of the radar system, wherein the first DNN generates first output data based upon the raw sensor data. The method further includes transmitting the first output data to a centralized data processing device of the AV, wherein the centralized data processing device of the AV provides the first output data as input to a second DNN that is executed by the centralized data processing device, and further wherein the second DNN generates second output data based upon the first output data. The method additionally includes assigning a label to an object represented in the raw sensor data based upon the second output data, wherein the label is indicative of an identity of the object, and performing a driving maneuver based upon the label assigned to the object.

(A2) In some embodiments of the method of A1, the first DNN includes a graph neural network.

(A3) In some embodiments of at least one of the methods of A1-A2, the first output data is values of embedded features in the raw sensor data.

(A4) In some embodiments of at least one of the methods of A1-A3, the radar system is a frequency modulated continuous wave (FMCW) radar system.

(A5) In some embodiments of at least one of the methods of A1-A4, transmitting the first output data to a centralized data processing device of the AV comprises transmitting the first output data over an Ethernet connection to the centralized data processing device of the AV.

(A6) In some embodiments of at least one of the methods of A1-A5, the data processing device of the radar system is a digital signal processor of the radar system.

(A7) In some embodiments of at least one of the methods of A1-A6, the method further includes generating, by a camera system of the AV, image data; and transmitting the image data to the centralized data processing device of the AV, wherein the centralized data processing device of the AV provides the image data or a derivate thereof as input to the second DNN that is executed by the centralized data processing device, and further wherein the second DNN generates the second output data based upon the image data or the derivate thereof.

(A8) In some embodiments of at least one of the methods of A1-A7, the centralized data processing device receives the image data and generates the derivative of the image data, and further wherein the centralized data processing device of the AV provides the derivative of the image data as input to the second DNN.

(A9) In some embodiments of at least one of the methods of A1-A8, the raw sensor data is a tensor that includes range, velocity, and azimuth values.

(B1) In another aspect, some embodiments include a method, where the method includes acts of: (1) receiving, from a local data processing device of a radar system of an AV, a feature vector output by a first DNN that is executed by the local data processing device, wherein the local data processing device generates the feature vector based upon raw sensor data provided as input to the first DNN, wherein the raw sensor data includes phase information; (2) providing the feature vector as input to a second DNN that is executed by the processor, wherein the second DNN generates output that is indicative of a type of an object in an environment of the AV, wherein the second DNN generates the output based upon the feature vector; (3) assigning a label to the object based upon the output of the second DNN, wherein the label identifies the type of the object; and (4) controlling at least one of a propulsion system, a braking system, or a steering system of the AV based upon the label assigned to the object.

(C1) In yet another aspect, some embodiments include a computer-readable storage medium comprising instructions that, when executed by a processor, cause the processor to perform the method of (B1).

(D1) In still yet another aspect, some embodiments include an AV that is configured to perform the method of (B1).

(E1) In another aspect, some embodiments include an AV, where the AV includes a propulsion system, a braking system, a steering system, and a radar system. The radar system includes a local data processing device and local memory, where the local memory has a first DNN stored therein that is executed by the local data processing device. The AV further includes a centralized data processing device that is operably coupled to the propulsion system, the braking system, the steering system, and the radar system. The AV additionally includes centralized memory that has a second DNN stored therein, wherein the second DNN is executed by the centralized data processing device, wherein: 1) the local data processing device of the radar system generates raw sensor data based upon radar signals emitted by the radar system, wherein the raw sensor data includes phase information; 2) the local data processing device executes the first DNN using the raw sensor data as input to the first DNN to generate first output data; 3) the local data processing device transmits the first output data to the centralized data processing device; 4) the centralized data processing device executes the second DNN using the first output data as input to the second DNN to generate second output data, wherein the second output data is indicative of a type of object in an environment of the AV; 5) the centralized data processing device assigns a label to the object based upon the second output data, the label identifies the type of the object; and 6) the centralized data processing device controls at least one of the propulsion system, the braking system, or the steering system of the AV based upon the label assigned to the object.

(E2) In some embodiments of the AV of E1, the first output data is transmitted from the local data processing device to the centralized data processing device by way of an Ethernet connection.

(E3) In some embodiments of the AV of at least one of E1-E2, the centralized data processing device executes the second DNN using third output data as input to the second DNN to generate the second output data, wherein the third output data is based upon data generated by a second local data processing device that executes a third DNN using raw sensor data output by a sensor system.

(E4) In some embodiments of the AV of at least one of E1-E3, the sensor system is a camera.

(E5) In some embodiments of the AV of at least one of E1-E4, the sensor system is a second radar system.

(E6) In some embodiments of the AV of at least one of E1-E5, the raw sensor data is in a form of a tensor.

(E7) In some embodiments of the AV of at least one of E1-E6, the first DNN and the second DNN are jointly trained prior to being executed by the local data processing device and the centralized data processing device.

(E8) In some embodiments of the AV of at least one of E1-E7, the local data processing device is a digital signal processor (DSP) that is on a chip of the radar system.

(E9) In some embodiments of the AV of at least one of E1-E8, the radar system is a frequency modulated continuous wave (FMCW) radar system.

(E10) In some embodiments of the AV of at least one of E1-E9, the first DNN includes a graph neural network.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle (AV) comprising:
a propulsion system;
a braking system;
a steering system;
a radar system, wherein the radar system includes a local data processing device and local memory, wherein the local memory has a first deep neural network (DNN) stored therein that is executed by the local data processing device;
a centralized data processing device that is operably coupled to the propulsion system, the braking system, the steering system, and the radar system; and centralized memory that has a second DNN stored therein, wherein the second DNN is executed by the centralized data processing device, wherein:
  the local data processing device of the radar system generates raw sensor data based upon radar signals emitted by the radar system, wherein the raw sensor data includes phase information;
  the local data processing device executes the first DNN using the raw sensor data as input to the first DNN to generate first output data;
  the local data processing device transmits the first output data to the centralized data processing device;
  the centralized data processing device executes the second DNN using the first output data as input to the second DNN to generate second output data, wherein the second output data is indicative of a type of object in an environment of the AV, wherein the first DNN and the second DNN are jointly trained prior to being executed by the local data processing device and the centralized data processing device;
  the centralized data processing device assigns a label to the object based upon the second output data, the label identifies the type of the object; and
  the centralized data processing device controls at least one of the propulsion system, the braking system, or the steering system of the AV based upon the label assigned to the object.

2. The AV of claim 1, wherein the first output data is transmitted from the local data processing device to the centralized data processing device by way of an Ethernet connection.

3. The AV of claim 1, wherein the centralized data processing device executes the second DNN using third output data as input to the second DNN to generate the second output data, wherein the third output data is based upon data generated by a second local data processing device that executes a third DNN using raw sensor data output by a sensor system.

4. The AV of claim 3, wherein the sensor system is a camera.

5. The AV of claim 3, wherein the sensor system is a second radar system.

6. The AV of claim 1, wherein the raw sensor data is in a form of a tensor.

7. The AV of claim 1, wherein the first DNN and the second DNN are jointly trained prior to being executed by the local data processing device and the centralized data processing device.

8. The AV of claim 1, wherein the local data processing device is a digital signal processor (DSP) that is on a chip of the radar system.

9. The AV of claim 1, wherein the radar system is a frequency modulated continuous wave (FMCW) radar system.

10. The AV of claim 1, wherein the first DNN includes a graph neural network.

11. The AV of claim 1, wherein the first output data comprises embedded features from the raw sensor data.

12. A method performed by an autonomous vehicle (AV), the method comprising:
  generating, by a radar system of the AV, raw sensor data, wherein the raw sensor data includes complex values;
  providing the raw sensor data as input to a first deep neural network (DNN) that is executed by a data processing device of the radar system, wherein the first DNN generates first output data based upon the raw sensor data;
  transmitting the first output data to a centralized data processing device of the AV, wherein the centralized data processing device of the AV provides the first output data as input to a second DNN that is executed by the centralized data processing device, and further wherein the second DNN generates second output data based upon the first output data, wherein the first DNN and the second DNN are jointly trained prior to being executed by the local data processing device and the centralized data processing device;
  assigning a label to an object represented in the raw sensor data based upon the second output data, wherein the label is indicative of an identity of the object; and
  performing a driving maneuver based upon the label assigned to the object.

13. The method of claim 12, wherein the first DNN includes a graph neural network.

14. The method of claim 12, wherein the first output data is values of embedded features in the raw sensor data.

15. The method of claim 12, wherein the radar system is a frequency modulated continuous wave (FMCW) radar system.

16. The method of claim 12, wherein transmitting the first output data to a centralized data processing device of the AV comprises transmitting the first output data over an Ethernet connection to the centralized data processing device of the AV.

17. The method of claim 12, wherein the data processing device of the radar system is a digital signal processor of the radar system.

18. The method of claim 12, further comprising:
  generating, by a camera system of the AV, image data;
  transmitting the image data to the centralized data processing device of the AV, wherein the centralized data processing device of the AV provides the image data or a derivate thereof as input to the second DNN that is executed by the centralized data processing device, and further wherein the second DNN generates the second output data based upon the image data or the derivate thereof.

19. The method of claim 18, wherein the centralized data processing device receives the image data and generates the derivative of the image data, and further wherein the centralized data processing device of the AV provides the derivative of the image data as input to the second DNN.

20. The method of claim 12, wherein the raw sensor data is a tensor that includes range, velocity, and azimuth values.

21. A non-transitory computer-readable storage medium comprising instructions that, when executed by a processor, cause the processor to perform acts comprising:
  receiving, from a local data processing device of a radar system of an autonomous vehicle (AV), a feature vector output by a first deep neural network (DNN) that is executed by the local data processing device, wherein the local data processing device generates the feature vector based upon raw sensor data provided as input to the first DNN, wherein the raw sensor data includes phase information;
  providing the feature vector as input to a second DNN that is executed by the processor, wherein the second DNN generates output that is indictive of a type of an object in an environment of the AV, wherein the second DNN generates the output based upon the feature vector, and further wherein the first DNN and the second DNN are jointly trained prior to being executed by the local data processing device and the centralized data processing device;

assigning a label to the object based upon the output of the second DNN, wherein the label identifies the type of the object; and controlling at least one of a propulsion system, a braking system, or a steering system of the AV based upon the label assigned to the object.

\* \* \* \* \*